INVENTOR.
BURTON L. JONES
BY
Albert W. Scribner

Feb. 1, 1966 B. L. JONES 3,232,401

SELECTION INDICATING DISKS WITH UNSELECTED CHARACTERS OBSCURED BY SHADED AREAS ON UNDERNEATH DISK

Filed Aug. 12, 1964 2 Sheets-Sheet 2

INVENTOR.

BURTON L. JONES

BY

Albert W. Scribner

United States Patent Office 3,232,401

Patented Feb. 1, 1966

3,232,401

SELECTION INDICATING DISKS WITH UNSELECTED CHARACTERS OBSCURED BY SHADED AREAS ON UNDERNEATH DISK

Burton L. Jones, New Canaan, Conn., assignor to Pitney-Bowes, Inc., Stamford, Conn., a corporation of Delaware Filed Aug. 12, 1964, Ser. No. 389,529
5 Claims. (Cl. 197—6.4)

This invention relates to an improved indexing control arrangement for facilitating the selective positionment of a movable member. More particularly the invention relates to a novel indexing control arrangement for embossing machines wherein at least a portion of either one of two groups or rows of indicia may be selectively rendered visibly obscure so as to facilitate the indexing use of the other one of said indicia groups.

In many conventional type embossing machines a hand wheel or the like is provided for rotatably indexing a die supporting drum to various rotary positions so as to sequentially bring selected pairs of cooperating dies into a printing or embossing position. This selevtice indexing of the hand wheel is usually accomplished by the use of an indicia scale and a cooperating pointer, each scale including a row of characters. As long as only one scale and an associated pointer are used no indexing difficulty is encountered, however when two groups of indicia and two respectively associated pointers are to be used in connection with the indexing of a single hand wheel then precautions must be taken to insure that the machine operator will use the correct pointer with the correct scale. This requirement may be readily appreciated where, as in the instant case for example, the machine is provided with two rows of characters, one row being upper case and the other row lower case, which respectively cooperate with two separate pointers and where the operator must take care to use the correct pointer with the correct character case.

The primary object of the instant invention is to provide an improved indexing device wherein two individual groups of indicia and two respectively associated pointers are provided in connection with a single member to be indexed, and wherein a machine operator may at any time readily recognize which pointer is cooperating with which group of indicia.

Another object of the invention is to provide a novel indexing control means wherein either of two indexing scales may be selectively visibly obscured so as to render the non-obscured scale visibly apparent for cooperation with a given pointer.

A further object of the invention is to provide a novel rotary indexing control combination wherein two groups of dark character images are placed on a stationary transparent member which overlies a wheel that is to be rotatably indexed, said wheel being provided with two pointers and two darkened background fields or stripes which respectively cooperate with said two groups of character images.

Other objects of the invention will become apparent as the disclosure progresses.

Figures 1, 2, 3:
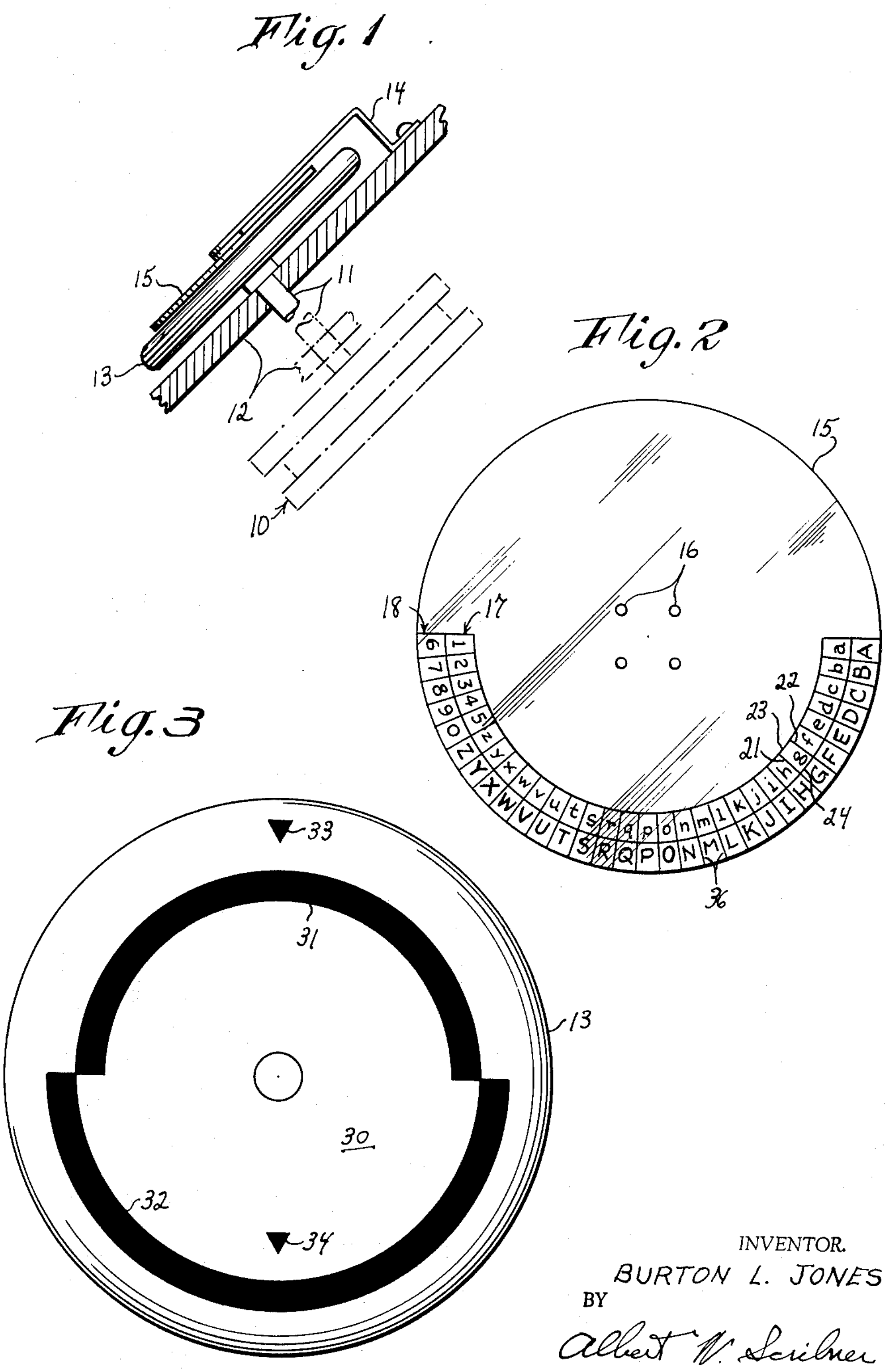
FIG. 1 is a side elevational view in partial section and illustrates the structural arrangement of the instant apparatus.
FIG. 2 is a plan view of a transparant scale bearing disc which forms part of the combination shown in FIG. 1.
FIG. 3 is a plan view of a background field bearing hand wheel that is to be manually rotatably indexed in the arrangement of FIG. 1.

Referring to FIG. 1 there is shown a structural arrangement which embodies the elements of the instant invention and which includes an embossing die supporting head or drum 10 secured to a shaft 11 that is rotatably mounted in an embossing machine frame 12. Secured by any suitable means to the outer end of shaft 11 is an indexing hand wheel 13 that is manually rotatable so as to index the die supporting head 10 to successive rotary positions in accordance with the locations on the drum of the respective dies that are to be sequentially used in the character embossing operations. A bracket arm 14 is fixedly secured to the machine frame 12 and extends over and radially inwardly of the said wheel 13. Fixed to the free end of the bracket arm 14 is a translucent or transparent disc 15, said disc being disposed in concentric and closely spaced overlying relation with respect to the outer face of said wheel.

Figure 4:
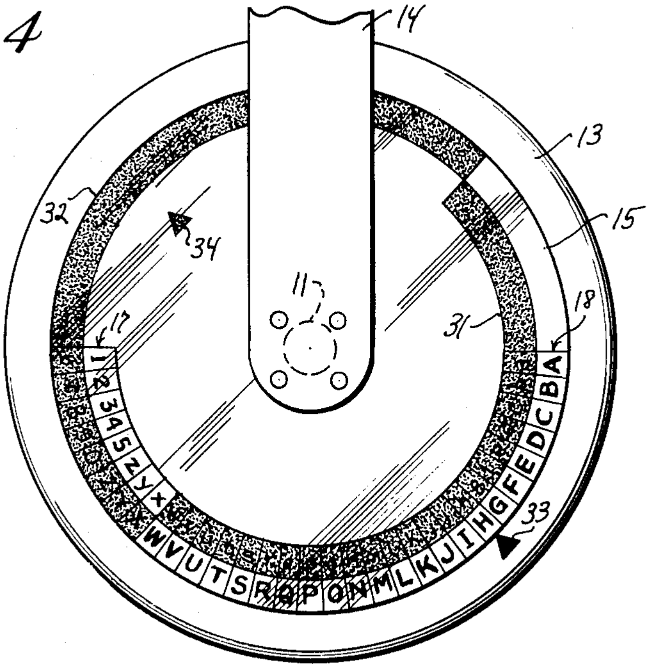
FIG. 4 is a plan view of the wheel and transparent disc in superimposed assembled condition; these elements being shown in one condition wherein one pointer and its associated scale are operative.
Figure 5:
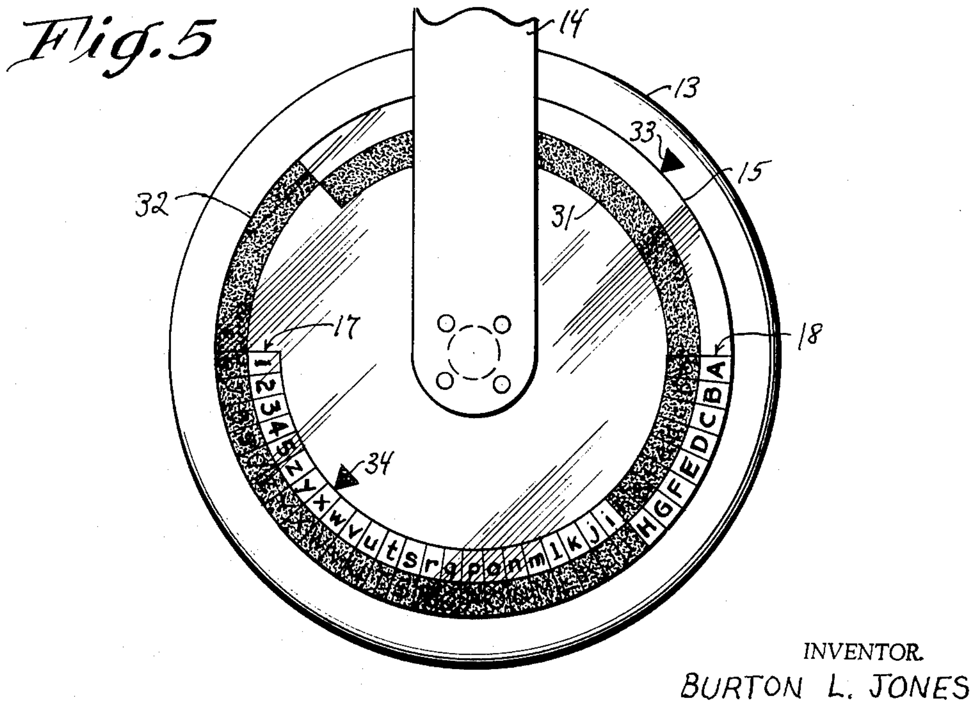
FIG. 5 is a plan view of the assembled disc and wheel in a second condition wherein the other pointer and its associated scale are operative.

The details of the above mentioned disc and wheel willl be discussed in connection with FIGS. 2 and 3 respectively, and the visual nature of the cooperation between said wheel and disc will be discussed in connection with FIGS. 4 and 5. The disc 15 is comprised of a circular piece of transparent plastic, or like material, having a series of holes 16 formed near the central portion thereof to facilitate attachment of the disc to said bracket arm 14. Disposed about the periphery of the lower 180 degree sector of the disc are two concentric scales defined by two semicircular rows or groups 17 and 18 of characters. Each character image is preferably dark in color and is formed by any suitable technique such as printing, etching, painting, etc. The radially inner group 17 of characters includes lower case letters and certain additional characters, while the outer group 18 includes upper case letters and other additional characters. Each character is disposed in a quadrangle defined by two radial lines such as 21, 22 and two short circular arcs such as 23 and 24.

The wheel 13 is circular; the periphery thereof affording a means for gripping and manually turning the wheel in either rotational direction. The exposed face 30, FIG. 3, of the wheel is provided with two diametrically opposed semi-circular stripes of darkened background fields 31 and 32 having effective radiin that are respectively equal to the effective radii of the semi-circular rows 17 and 18 of characters on the disc 15. The wheel face is also provided with two index pointers or marks 33 and 34 which are circumferentially disposed approximately midway along said arcuate stripes 31 and 32; both marks pointing in the same direction. The pointer 33 is spaced radially outward from the stripe 31 a distance substantially equal to the length of lines such as 36 on disc 15, while the pointer 34 is spaced radially inward from stripe 32 a distance substantially equal to the length of said lines 21, 22 of said disc.

A discussion of the cooperation between the superimposed disc and wheel will now be made in connection with FIGS. 4 and 5. Referring to FIG. 4 it will be seen that when pointer 33 on the wheel cooperates with the upper case character scale 18 the wheel may be selectively rotated to various rotational positions wherein at any given time the upper case character pointed to by the pointer 33 is the character that will be embossed by the die set then located at the work station of the embossing machine. While pointer 33 is cooperating with upper case scale 18 as illustrated in FIG. 4 the semi-circular darkened background field or stripe 31 on the wheel will be located behind at least the adjacent portion of lower case character scale 17 of the transparent disc and this relative positionment will render that portion of the inoperative scale 17 in the region of said pointer 33 visibly obscure. In similar fashion when the pointer 34 on the wheel cooperates with the lower case character scale 17, as illustrated in FIG. 5, the adjacent portion of the inoperative upper case character scale 18 will be visibly obscured by the background stripe 32. This general "shading out" effect causes the scale that is being used to visibly stand out while at least the adjacent portion of the scale that is not being used is rendered obscure. The colors and the shade intensities of the stripes 31, 32 and the characters in rows 17, 18 may vary from machine to machine, but should be similar for any given machine.

Using the instant arrangement a rapid and reliable indexing of the wheel 13 is readily obtainable and the operator can at any time tell at a glance which row of characters is being used and which character in the row has been selected merely by observing the pointer which is located within the lower 180 degree sector of the transparent disc 15. This type of indexing control arrangement has been found to be very efficient and convenient.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. In an indexing control means for an embossing machine:

a frame;

a shaft rotatably mounted in said frame;

an embossing die supporting drum rotatably coupled to said shaft;

a control wheel secured to the outer end of said shaft; and a translucent member secured to said frame and disposed in close overlying relation with respect to the outer face of said control wheel;

said translucent member having two arcuate rows of character images formed thereon and disposed in the same sector of said member;

said wheel having on its face two background fields defined by sections of annuli that have effective radii which respectively correspond to those of said two arcuate rows of character images;

said wheel also having on its face two index pointer marks respectively associated with the said two rows of character images on said translucent disc whereby when one of said index pointer marks on said wheel is cooperating with one of said arcuate rows of character images on said translucent member one of said background fields on said wheel visibly obscures at least an adjacent portion of the other arcuate row of character images.

2. Apparatus as defined by claim 1 wherein said pointer marks and said background fields are in different sectors of said wheel and wherein said index pointer marks are respectively located substantially midway along the arcuate length of said background fields and each mark points in substantially the same direction for any given rotational position of said wheel.

3. A hand wheel indexing control means: comprising a frame;

a hand wheel having on its outer face two background fields defined by a pair of concentric diametrically opposed substantially semi-annular stripes that have different effective radii, said hand wheel face also having thereon two index pointer marks, said marks being respectively disposed adjacent said semi-annular stripes;

a transparent disc disposed in close overlying relation with respect to the exposed face of said wheel;

said transparent disc having a pair of concentric substantially semi-circular rows of character images thereon, said rows being disposed in the same sector of same said disc and having effective radii which respectively correspond to those of said semi-annular stripes on said wheel face whereby when either one of said index pointer marks is cooperating with its associated row of character images one of said semi-annular stripes on said wheel face effectively obscures at least a portion of the other row of character images; and means on said frame for mounting said wheel and disc for relative rotational movement.

4. Apparatus as defined by claim 3 wherein one of said index pointer marks is located on the radial outer side of its associated row of character images, while the other of said index pointer marks is located on the radial inner side of its associated row of character images.

5. An index control means: comprising a frame;

a transparent member secured to said frame;

said transparent member having two laterally adjacent rows of characters formed thereon; and a movable member mounted for indexing movement on said frame;

said movable member having two pointers thereon which respectively cooperate with said two rows of characters;

said movable member also having two background stripes which are respectively movable into underlying relation with respect to said two rows of characters on said transparent member whereby when either pointer is cooperating with its associated row of characters at least a portion of the other row of characters is effectively visibly obscured by the related one of said background stripes.

References Cited by the Examiner

UNITED STATES PATENTS

| | | | |
|---|---|---|---|
| 339,078 | 3/1886 | Spiro | 197—47 |
| 382,164 | 5/1888 | Escobar | 197—46 |
| 666,906 | 1/1901 | Pierpoint | 40—61 |
| 987,626 | 3/1911 | Hartog | 197—6.7 |
| 1,350,459 | 8/1920 | Johanson | 197—6.4 |
| 2,380,171 | 7/1945 | Hammer | 58—126 |
| 2,583,797 | 1/1952 | Rosfelder | 58—126 |

ROBERT E. PULFREY, *Primary Examiner.*